US006445782B1

United States Patent
Elfe et al.

(12)

(10) Patent No.: US 6,445,782 B1
(45) Date of Patent: Sep. 3, 2002

(54) SERVICE MANAGEMENT SYSTEM FOR USE IN COMMUNICATIONS

(75) Inventors: Charles D. Elfe, Durham, NH (US); David Lesaint, Ipswich (GB); Nader Azarmi, Essex (GB); Stephen L. Corley, Ipswich (GB); Eugene C. Freuder, Durham, NH (US)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/068,503

(22) PCT Filed: Nov. 19, 1997

(86) PCT No.: PCT/US97/21218

§ 371 (c)(1),
(2), (4) Date: May 12, 1998

(87) PCT Pub. No.: WO98/23098

PCT Pub. Date: May 28, 1998

(30) Foreign Application Priority Data

Nov. 19, 1996 (GB) .............................................. 9624173
Nov. 25, 1996 (EP) ............................................. 96308484

(51) Int. Cl.[7] .............................................. H04M 3/42
(52) U.S. Cl. ............................ 379/201.01; 379/201.05; 379/207.02
(58) Field of Search ................................ 379/201, 207, 379/220, 230, 229, 219

(56) References Cited

U.S. PATENT DOCUMENTS 5,251,255 A * 10/1993 Epley .......................... 379/207
5,337,351 A * 8/1994 Manabe et al. .............. 379/201
5,404,396 A * 4/1995 Brennan ...................... 379/201
5,448,631 A * 9/1995 Cain ........................... 379/207
5,450,480 A * 9/1995 Man et al. ................... 379/201
5,907,607 A * 5/1999 Waters et al. ............... 379/207
5,966,434 A * 10/1999 Schafer et al. .............. 379/220
5,999,610 A * 12/1999 Lin et al. ..................... 379/201

OTHER PUBLICATIONS

Conry et al., Multistage Negotiation for Distributed Constraint Satisfaction, IEEE 1991.*
Faci, Detecting Feature Interactions in Telecommunications Systems Designs, 1995.*

* cited by examiner

Primary Examiner—Ahmad F. Matar
Assistant Examiner—Hector Agdeppa
(74) Attorney, Agent, or Firm—Nixon & Vanderhye P.C.

(57) ABSTRACT

A feature checker provides the ability to review communications service features for interaction problems at service creation time, or at runtime. Hence a feature can be reviewed against existing service features or against a specific other user's features.

The feature checker is based on modelling communications service features as constraint satisfaction problems in which constraints 600, 605 determine preset relationships between values 610, 615 for variables 200, 215, 300, 400 of the feature. The model can then be searched for inconsistencies which indicate feature interaction. Interaction can be solved by building in an "alternative invoke" 610 for a feature which overcomes the inconsistency. This might be for instance a form of invoke which, when instantiated, actively suppresses a conflicting feature.

17 Claims, 12 Drawing Sheets

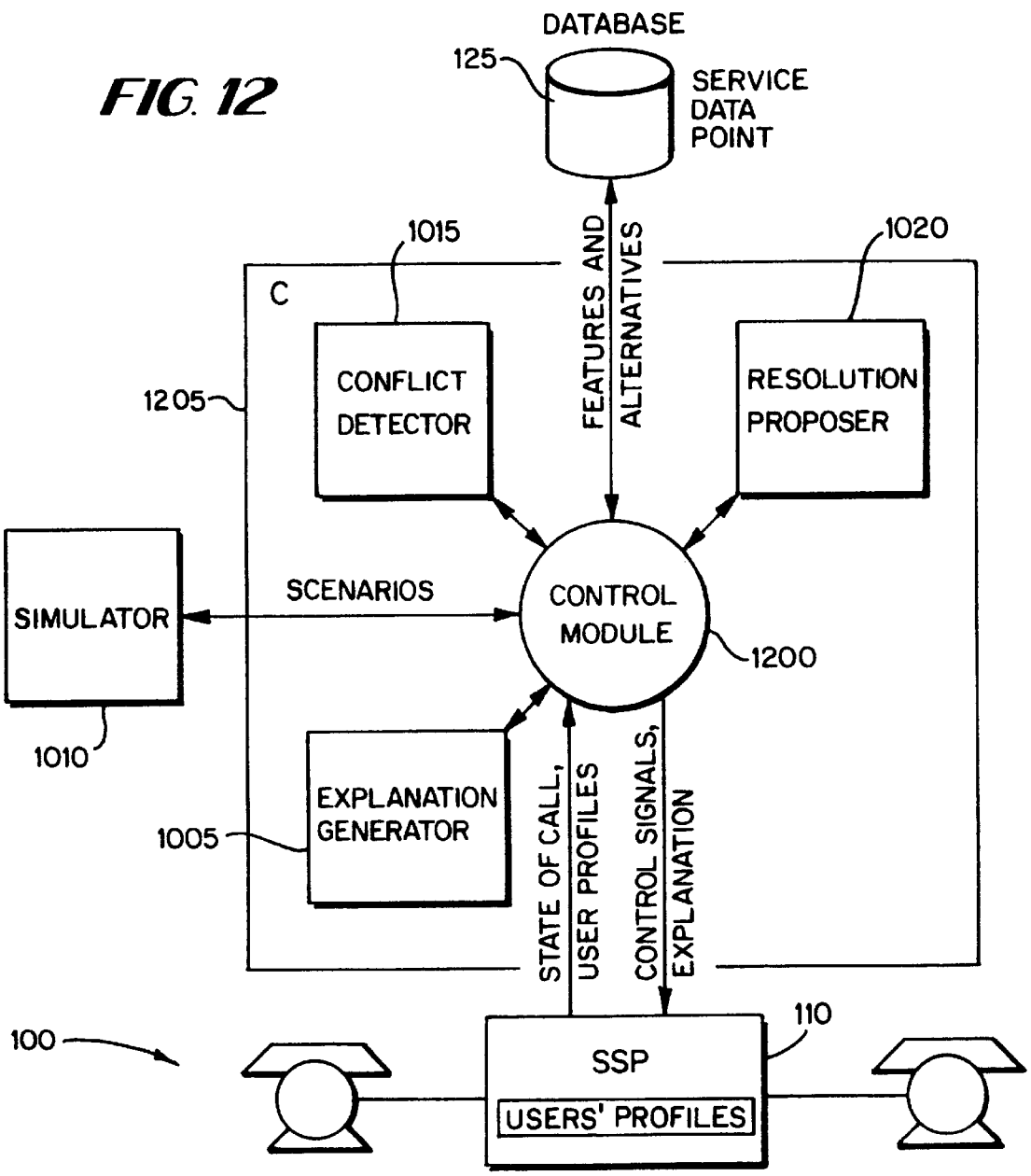

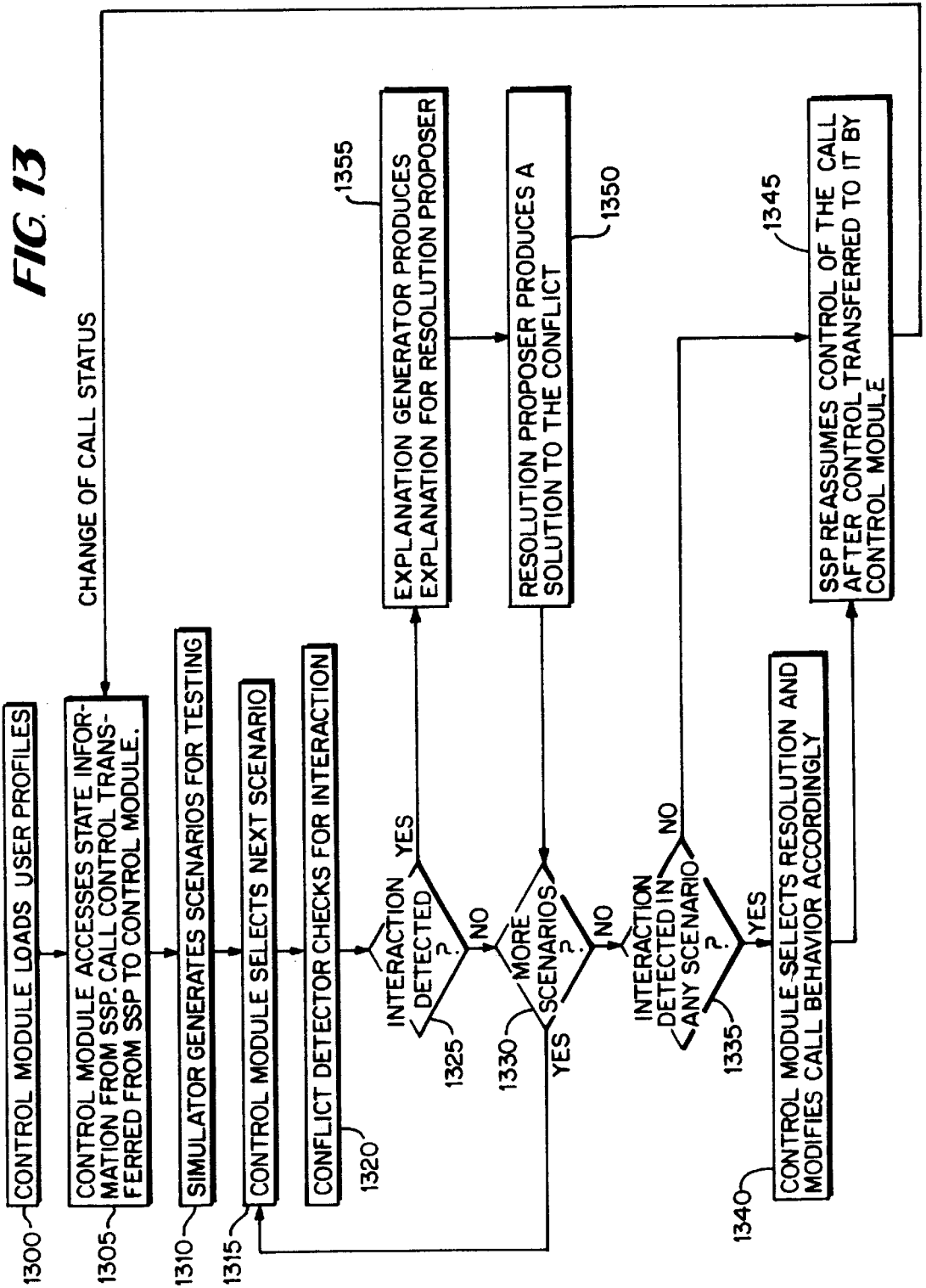

SERVICE MANAGEMENT SYSTEM FOR USE IN COMMUNICATIONS

BACKGROUND OF THE INVENTION

1. Field of the Invention

The present invention relates to service management systems for use in communications networks and finds particular application in managing interactions between service features.

2. Description of the Related Art

Communications systems have become so large and complex that it has become difficult to predict the occurrence of possible interactions among their components. These interactions can result in the loss of intended functionality or cause unforeseen side-effects.

Modelling communication systems as dynamic constraint satisfaction problems is proposed as a means of performing avoidance, detection, and resolution of interactions. Methods for isolating the components responsible for the interaction are also discussed, as are ways of automatically generating inferences about them.

Communications systems have come a long way from providing simple telephone service. As the list of services provided has increased, so has the underlying complexity of the system. In the US, heterogeneity of service providers has compounded the problem by being based on inhomogeneous hardware and software. Even for a single service provider, the underlying networks and protocols can differ depending upon usage and types of services provided. The result is an incredibly large and complex system whose operation can be viewed as multiple levels of functional and logical abstraction. The management of such a system, such that consistent and high quality service is maintained, can become an overwhelming task.

A burr in the heel of consistent and high quality communications service is the feature interaction problem. Roughly speaking, features can be considered the services provided by the communications system. The potential problem that can arise, especially today with a large, increasing number of features available, is that different features, or multiple instances of the same feature, can cause unforeseen and unintended behaviour when operating together. An example of feature interaction is as follows:

Consider two common features provided to phone customers: call waiting (CW) and call forwarding on busy (CFB). Call waiting notifies the call recipient, who is already on the line, of an incoming call and allows the recipient to switch between the two calls, connecting with one, suspending the other. Call forwarding on busy, which engages when the recipient is already on the line, allows the recipient to have calls directed to another number. This features do not notify the call recipient. Both CW and CFB connect as normal calls when the recipient is not busy.

Separately, each feature can operate without any interaction. However, when both features are activated and the recipient is busy, interaction occurs, due to the fact that neither feature can be performed without sabotaging the operation of the other. Specifically, there are two different and conflicting actions to be performed when the call recipient is busy.

In "Feature Interactions in Telecommunications Systems", by E. Jane Cameron and Hugo Velthuijsen, published in the IEEE Communications Magazine Vol. 31, No. 3, pp 18–22, August 1993, three fundamental aspects of feature interaction problems are listed as avoidance, detection, and resolution.

The idea of avoidance of feature interaction is that relevant specifications are made clear enough that conflicts do not occur between features, whether in the design phase or at the point they are invoked. Avoidance can be extended to include those cases where it might have occurred, yet alternatives existed that allowed the features to be invoked without interaction.

Detection of interaction is useful in a number of stages. It can be used as a guide to designers at the point that they are creating new features and can also inform the system or the user of possible conflicts at the point a feature is added or invoked.

In order for the information to be useful, some sort of resolution is to be expected, such as all or some of the features involved in the conflict being modified or removed.

Published efforts have focused on providing examples of interactions and categorising the different ways they can occur, such as in "A Feature Interaction Benchmark for IN and Beyond", by Cameron et al, IEEE Communications Magazine, Volume 31, No. 3, pp 64–69, 1993. In this publication, the authors attempt to classify various types of interaction based upon the basic cause of the interaction and posit that much of the problem is the failure to specify clearly a feature's intended behaviour. In "A Method for Detecting Service Interactions", by Wakahara et al, IEEE Communications Magazine, Volume 31 No. 8, pp 32–37, the occurrence of feature interaction is attributed to a system's lack of three types of knowledge, such as the implicit relationships among features, yet no systematic approach is given that could be automated to acquire this information. In "Specifying Telephone Systems in LOTOS and the Feature Interaction Problem", by Boumezbeur et al, IEEE Communications Magazine, Volume 31 No. 3, pp 38–45, August 1993, the use of LOTOS as a tool to model interaction is presented, where features' processes and subprocesses can be represented and then symbolically executed to detect interaction. In "A Practical Approach to Service Interaction", by Kuisch et al, IEEE Communications Magazine, Volume 31 No. 3, pp 24–31, 1993, interaction is viewed as overlapping or intersecting control intervals within a high-level framework known as the Basic Call State Model. "Service Interaction in an Object-Orientated Environment", by Mierop et al, IEEE Communications Magazine, Volume 31 No. 8, pp 46–51, 1993, suggests an object-oriented approach in which feature interaction corresponds to the common use of a basic call object by two or more features. A more distributed approach is given in "The Negotiating Agents Approach to Runtime Feature Interaction Resolution", by Griffeth et al, published in "Feature Interactions in Telecommunications Systems", at pp 217–234, edited by W Bouma and Hugo Velthuijsen, 1994, where the process of creating a situation free of interaction is viewed as a negotiating process between agents.

BRIEF SUMMARY OF THE INVENTION

According to the present invention, there is provided a feature interaction management system, for use in the provision of communications services over a communications network by means of running call processing logic to control the network, wherein the feature interaction management system comprises:

(i) access to a feature representation store for storing constraint-based representations of service features;

(ii) a scenario simulator for providing simulations of call instance scenarios involving at least one communications service feature; and (iii) a conflict detector for detecting conflicts between feature representations in a simulated call instance scenario, wherein the conflict detector is adapted to detect conflicts by generating at least one constraint satisfaction problem and detecting inconsistencies in the constraint satisfaction problem, the problem comprising at least two constraint-based feature representations and a set of values for call instances, the set of values being provided by a simulated call instance scenario.

It will be understood that references to "calls" and "call processing" should be taken as references to connections generally in a communications network, for the provision of voice, data or other services, a call potentially being established for instance between equipment with no human presence.

Preferably, the system further comprises a resolution generator for receiving detected conflict information from the conflict detector and for generating at least a partial resolution to a detected conflict.

Constraint satisfaction is a known approach to problem solving but in quite different domains, such as scheduling.

A management system according to an embodiment of the present invention might be associated with a service creation environment and/or a service delivery system. Hence, conflict resolution could be applied when a new service is created and/or when a service is to be run.

If conflict resolution is to be applied when a new service is created, then, if a constraint-based representation of a feature used in the new service is associated with a detected conflict in a simulated call instance scenario, then this information needs to be made available to the service creation environment such that the service logic for the feature can be modified before installation. The constraint-based representation of that new feature will also be modified before storage in the feature representation store for use in future conflict detection. Where a resolution generator is provided, the modification to the service logic or the feature representation can be made in accordance with a resolution, or partial resolution, generated by the resolution generator.

When the conflict is detected between features for different users at run time for a service, clearly it will be important to alter aspects of at least one of the features in order to resolve the conflict. A particularly useful aspect that may be provided in preferred embodiments of the present invention is the provision of an alternative value, "alternative invoke", being provided within constraint-based representations of features. In the associated service logic which is executed to provide the service feature to a user, this is translated to an alternative version of the service logic, so that the service feature actually operates in a different way. Thus the detection of the conflict provides a control mechanism which can be used effectively to "switch in" different service logic on detection of the conflict.

The modification to the feature representation in response to detection of a conflict may then be simply instantiation for a variable in a constraint-based representation as the value "alternative invoke". This provides a very simple means for selecting a feature in preference to another on detection of the conflict. The alternative invoke value may cause the selected feature to be invoked and to trigger a constraint so that the conflicting feature has a value instantiated as "DEFER" and consequently is not invoked.

Conflict between feature representations may arise because the feature representations make demands on common resources. If two features need to use the same resource in conflicting ways, then this will produce conflict. In preferred embodiments of the present invention, the conflict detector detects demands made on common network resources, by features, so as to cause conflict and the resolution generator is capable of generating a partial resolution in which some of those features which make demands on common network resources are deleted.

Where the management system is associated with service delivery at run time, preferably the resolution generator can generate a partial solution based on a minimum set of features to be deleted, or inhibited, with respect to services otherwise available to users. Preferably the resolution generator has the capability, for instance a default condition, in which the minimum set of features to be deleted or inhibited is distributed substantially evenly between affected users.

Additionally, or instead, the resolution generator may have access to priority data with respect to user services and may be capable of generating a resolution in which features are deleted or inhibited according to their relative priority. Said priority might be predetermined for instance by an affected user in respect of their own user or service profile, or it may be determined according to the priority of one user's services over another user's services. This might arise where one user pays a premium rate for guaranteed services while another user pays a lower rate but accepts potential loss or modification of services.

Given a particular communications scenario, it would be useful either at service creation or at service run-time to be able to determine (as described above) which components of a service, if any, are involved in an interaction and even more useful to determine the smallest subset of features actually responsible for the interaction. This subset of features can be stored as an inference about the features involved, so that subsequent attempts to use these features together need not rediscover, by recomputing from scratch, that this set of features leads to interaction. Instead, this information can be stored as an inferred "no-good", which can save a great deal of effort in a similar situation in the future. This information could also be fed back into the feature design phase, where it could be used to create features without this particular interaction.

Conversely, knowing which subsets of components, from all features provided, can be used together without causing an interaction, would also be useful. Precompiling this information into tables and then simply performing a lookup could be useful to bypass the potentially time consuming search task.

Ridding the system of the ability to interact entirely, by removing all features which could possibly interact at all or limiting their functionality, might result in a network too inflexible to be practical. For example, since it is known that CW and CFB do not work together, one solution would be to simply remove one of them from the system. However, it is possible that a customer might favour CW in some cases and CFB in other cases. Having removed a feature from the system, or reduced its functionality, no longer gives the customer the option. In more complex scenarios, these preferences might not just be single features, but could consist of sets of features.

A constraint satisfaction problem (CSP) in general consists of a set of variables, a set of values which can be assigned to each variable, and a set of constraints which describe the valid sets of assignments of values to variables. A solution to a constraint satisfaction problem is an assignment of a value to each variable that satisfies all of the constraints. Problems can be represented as graphs, where each variable is represented by a node, each value as a node's possible labels, and each constraint by a line, or lines, connecting the variables constrained.

For the purposes of embodiments of the present specification, a constraint satisfaction problem based on one or more feature representations could be expressed as a data set defining call processing in provision of communications services, the data set comprising:

i) an identifier for each of a set of variables, the set of variables comprising at least a service feature status, an equipment status and a call processing variable, ii) a set of values associated with each of the set of variables, which values can be instantiated in provision of a service or feature, and iii) a set of constraints which define, for instance by listing, combinations of values between different variables to be instantiated at the same time in provision of a service or feature.

Inconsistency in a constraint satisfaction problem is then identified by any two or more constraints which are incompatible in that they define respective combinations which specify a different value for the same variable. A solution of an inconsistency may then be the selection of a new value for a variable, usually together with at least one new constraint which applies to the new value and defines a combination which excludes the inconsistency.

In embodiments of the present invention, a constraint satisfaction problem is generated for a potential service feature together with at least one other service feature and the problem is reviewed to identify one or more inconsistencies. If one or more inconsistencies are identified, the data set represented by the problem is modified, for instance by changing a value and/or constraint, so as to eradicate one or more of the inconsistencies. The modified data set can then be used in the provision of improved communications services.

Due to the dynamic nature of the feature interaction problem, and most telecommunications problems in general, the basic CSP model is insufficient. What is required is a representation capable of modelling the changes that occur, such as when a communications session is initiated. As a result, a form of dynamic CSP representation is needed.

BRIEF DESCRIPTION OF THE DRAWINGS

A feature interaction management system according to an embodiment of the present invention will now be described, by way of example only, with reference to the accompanying Figures in which.

FIG. 12 shows schematically components of a feature checker for the feature interaction management system for use at service run time; and FIG. 13 shows a flow chart of the steps involved in conflict detection at service run time.

DESCRIPTION OF EXEMPLARY EMBODIMENTS

Figure 1:
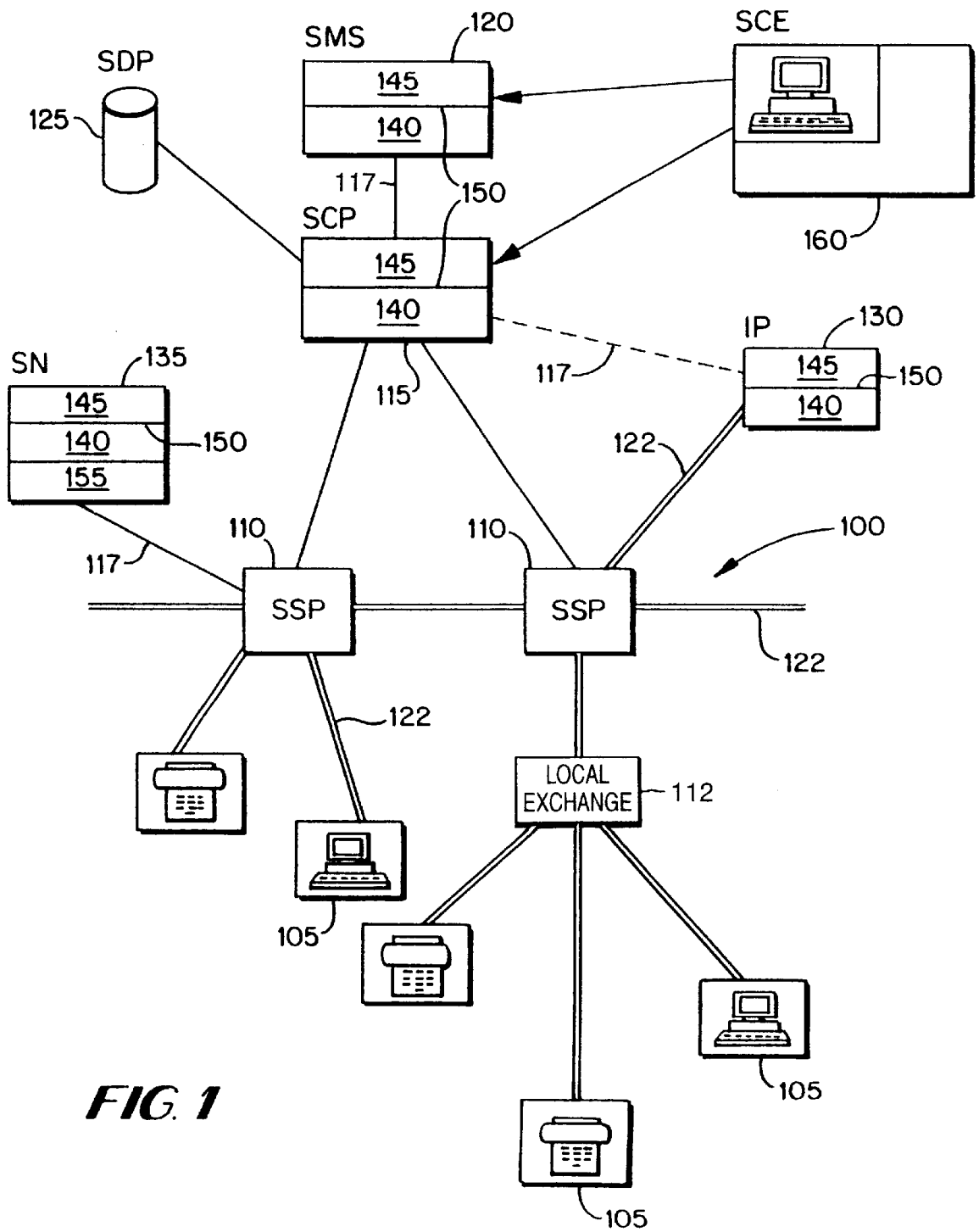
FIG. 1 shows a schematic representation an IN type architecture in which the feature interaction management system would sit.

Referring to FIG. 1, a known communications environment in which an embodiment of the present invention might be used is the intelligent network (IN) environment. In such environments, intelligence for use in providing communications services, such as those based on number translation, is provided outside the switches (exchanges) 110, 112 of a carrier network 100, for instance in a service control point 115 with an associated database, the service data point 125. Services can be created or modified in a service creation environment 160 and subsequently installed for use by a service control point 115 by means of a service management system 120.

The IN equipment is used to provide services over and above basic telephony, this being provided by means of the transmission network 100 as of old. The IN type services, such as those based on number translation, are provided differently.

In the British Public Switched Telecommunications Network (PSTN), there are both local and trunk exchanges 112, 110. Consumer premises Equipment (CPE) 105 is usually connected to a local exchange 112. Each local exchange 112 is then connected to at least one trunk exchange 110. The trunk exchanges 110 provide long distance communications.

In an IN environment, the trunk exchanges 110 each incorporate a Service Switching Point (SSP). When a call comes into a trunk exchange 110 from CPE 105, the Service Switching Point is used to pick out calls identified as needing IN services. It does this by reference to trigger tables in the SSP. If the call is an IN call, which will usually be identified by the associated destination number, the SSP in the switch 110 triggers intelligent processing by passing a request to an SCP 115. Numbers which do not trigger at the SSP in the switch 110 are routed and carried by the transmission network 100 as in the past.

On receipt of a request, an SCP 115 uses call-related information, usually the destination number, to locate service logic which it then executes. This service logic execution is done in a "Service Logic Execution Environment", or SLEE, in the SCP. The Service Data Point (SDP) 125 is used by the SCP 115 for information it needs in processing. After execution of the service logic, the SCP 115 passes control back to the exchange 110 and the call proceeds, carried by the transmission network 100 but now in accordance with the executed service logic.

Functionality in an IN architecture can be provided from various software modules. For instance, an Intelligent Peripheral 130 might be used to provide simple resources directly to the switch 110, such as security checks on the use of Personal Identity Numbers. Another development has been provision of a Service Node 135, this itself incorporating a switch. Service Nodes 135 can provide relatively complex resource interactions.

Information passing between elements of the intelligence layers of an IN architecture, for instance between the SCP 115 and the SMS 120, can be carried by signalling links 117. These are shown in FIG. 1 as single lines. The transmission network 100 however must carry voice and this extends to the connection to the intelligent peripheral 130 which may for instance provide a recorded speech message. These voice carrying links 122 are shown in FIG. 1 as double lines.

These functional blocks of equipment, the SCP 115, SMS 120, Service Node 135 and Intelligent Peripheral 130, generally comprise computing platform 140 on which sit applications 145. The applications 145 are pieces of software by means of which the computing platform 140 is controlled to provide functions, via an Applications Programming Interface (API) 150.

Functionality in an IN architecture can often optionally be provided from different places in the architecture. Looking at the SCP 115 and the service node 135, the service applications 145 which dictate the services which in practice are available to a network user can be provided from either system. However, there remains the need for services to be flexible and this has resulted in service creation facilities 160 taking on considerable significance.

Known service creation techniques are based on the use of standard sets of service logic building blocks which can be brought together in different combinations to provide new or different services. These are then made available to users of the transmission network 100 usually by being compiled at the SCP 115, and managed by means of the Service Management System (SMS) 120.

A feature interaction management system according to an embodiment of the present invention would be useful, in an IN environment, either in service creation or at the time of actual service provision. It could therefore conveniently be installed in either or both of the service creation environment 160 and the service control point 115 or service node 135. It could also alternatively be installed at an intelligent peripheral 130 or in one of the exchanges 110, 112 of the carrier network 100.

If the system is installed at the service creation environment 160, it can be used to detect and resolve interactions at the time of developing new service and feature specifications. If it is installed at the SCP 115, an intelligent peripheral 130, service node 135 or a trunk exchange 110, it can be used to detect and resolve interactions for single and multiple users at runtime. If it is installed at a local exchange 112, it can only be used to detect and resolve interactions for a single user at runtime.

The feature interaction management system could then be used either to alert the service creator to potential problems, and to propose a solution or partial solution, or to alert the communications user to a problem at runtime and for instance offer them a compromise version of a service feature.

Overall, the feature interaction management system takes as a starting point a communication service feature specification. It then models combinations of such service features as constraint satisfaction problems, assigns possible values to variables in the model, and reviews the model for inconsistencies. Inconsistencies which show no solution indicate a feature interaction. The system then reports interactions back to a user, a service creator, or potentially to other equipment, offering a solution or partial solution to the interaction. Accepted solutions or partial solutions are then used to generate correct or modified service logic, or to install workable values for variables at run time.

CSP Modelling of Telecommunications Services

Figure 2:
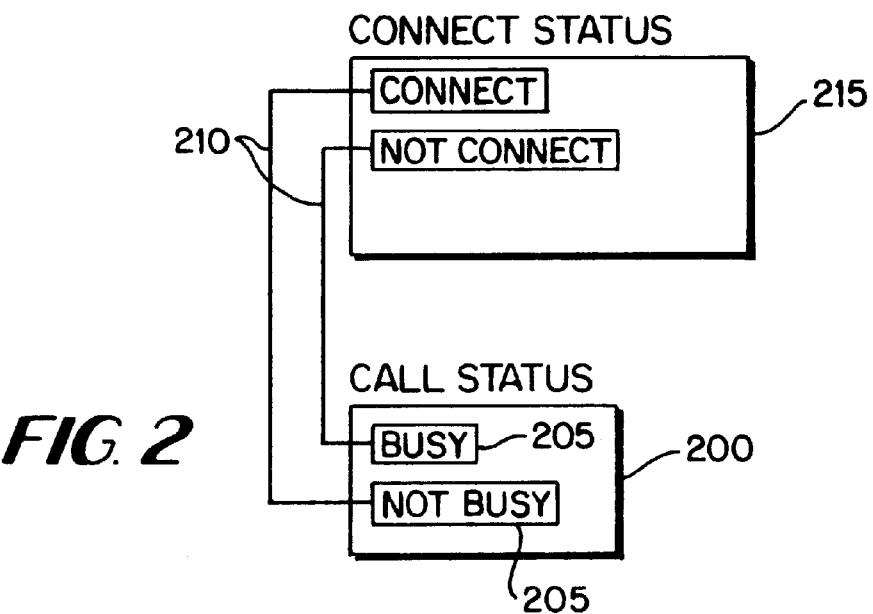
FIG. 2 shows a basic telecommunications service translated as a constraint satisfaction problem.

Referring to FIG. 2, as an example of how communications systems can be modelled as a CSP, one can consider a basic call service. There are two variables shown: CONNECT STATUS 215 and CALL STATUS 200. Each variable has two associated values 205, CONNECT and NOT CONNECT for the variable CONNECT STATUS 215, and BUSY and NOT BUSY for the variable CALL STATUS 200. The constraints are represented by lines 210, connecting values 105 from the two different variables 200, 215 in the graph, indicating the permitted combinations. For instance, as shown, when the value 205 for the variable CALL STATUS 200 is BUSY, then the variable CONNECT STATUS 215 is only permitted to take on the value NOT CONNECT, and when the value 205 for the variable CALL STATUS 200 is NOT BUSY, then the variable CONNECT STATUS 215 is only permitted to take on the value CONNECT.

For this constraint graph, the two sets of values 205 represent the only solutions. Note that since solutions exist in which each value of every variable participates, basic service can be provided free of interaction.

Figure 3:
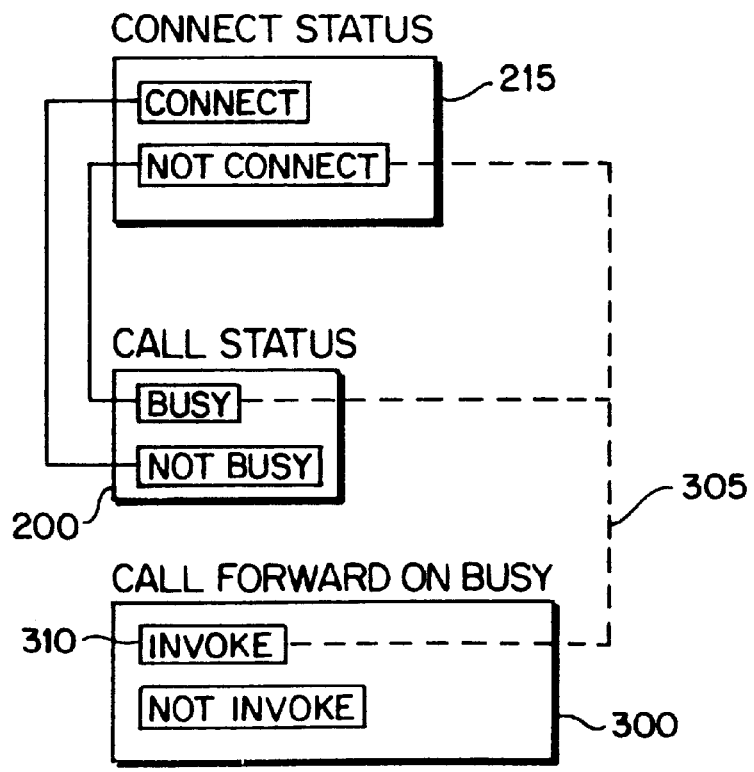
FIG. 3 shows the service of FIG. 2, augmented with the call forwarding on busy (CFB) feature.

In FIG. 3, basic call service is augmented with the call forwarding on busy (CFB) feature 300 and a new constraint 305 is added. The constraints 210 in FIG. 2 constrain only two variables and are known as binary constraints, whereas the new one, depicted in FIG. 3 by a dotted line 305, constrains three variables and is known as a ternary constraint. (For the sake of readability and since all combinations of values are allowed, all binary constraints between the variable CALL FORWARDING ON BUSY 300 and the two other variables have been omitted. This is also true for FIGS. 4, 5 and 6).

When the CFB variable 300 is instantiated with the value INVOKE 310, the CALL STATUS variable 200 could take on either BUSY or NOT BUSY. However, if it takes on BUSY, then the ternary constraint 305 would permit only the Value NOT CONNECT to be assigned to the variable CONNECT STATUS 215.

Figure 4:
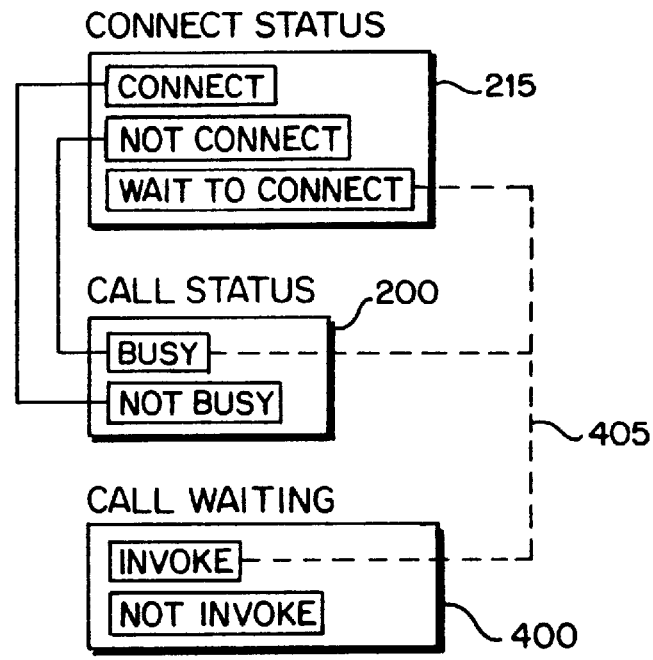
FIG. 4 shows the basic service of FIG. 2, augmented with the call waiting (CW) feature.

FIG. 4 shows how the variable CALL WAITING (CW) 400 can be added to the basic call configuration. The only difference here is that when CW is invoked and the caller is busy, the ternary constraint 405 permits only the value WAIT TO CONNECT for the variable CONNECT STATUS 215.

Figure 5:
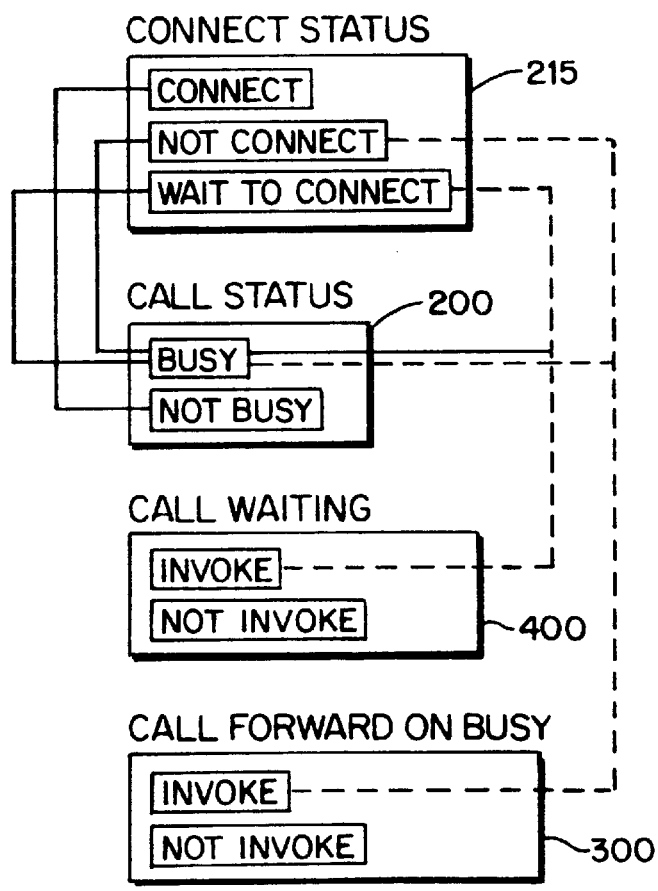
FIG. 5 shows the features of FIGS. 3 and 4 both added to the basic service of FIG. 2, and translated into a constraint satisfaction problem.

As described before, the real problem occurs when both features exist together. FIG. 5 depicts this situation. When both features are invoked and the value of the variable CALL STATUS 200 is BUSY then there are two conflicting assignments for the value of the variable CONNECT STATUS 215 which cannot be assigned at the same time. CW 400 requires a WAIT TO CONNECT assignment, yet CFB 300 requires the same variable to be assigned NOT CONNECT. Since there is no assignment of values to this constraint graph in which all of the constraints are satisfied, there is no solution to this constraint satisfaction problem. Consequently, these two features cannot be invoked without interaction.

Search techniques for locating inconsistencies in constraint satisfaction problems are known. For instance, search techniques which might be used are disclosed in "Arc-consistency and arc-consistency again" by Bessiera, C. published in Artificial Intelligence, volume 65 pp 108–1113, in 1994, and in "Comments on Mohr and Henderson's path-consistency algorithm", published in Artificial Intelligence, volume 36 pp 125–130, in 1988.

Though systematic search techniques will eventually uncover the fact that there is no solution to the problem in FIG. 5, consistency enforcing techniques like path consistency (PC) could also work in this case and potentially require less effort. A problem that is path consistent exhibits the quality that for all possible 3-tuples of variables, a consistent assignment of two of the variables can be extended to include the third variable, such that the values assigned to the 3-tuple satisfy all of the constraints. This is certainly not the case with the problem in FIG. 5. When NOT CONNECT is assigned to the variable CONNECT STATUS 215 and BUSY is assigned to the variable CALL STATUS 200, there is no value for CALL WAITING 400 which satisfies all of the constraints. Consequently, path consistency would be sufficient to expose this interaction.

As the number of features that a user has increases, the use of consistency enforcing techniques such as PC are likely to be useful, since in that case the problem represented in FIG. 5 would represent only a portion of the constraint graph. It would not be necessary to attempt solve the entire graph to detect an interaction.

It should be noted that not all feature interactions will be exposed with path consistency techniques. The technique has the potential however to expose some of them and provides an alternative to a systematic search.

In FIGS. 3, 4 and 5, the feature variables 300, 400 are provided with only the two values INVOKE and NOT INVOKE. This means that, when an inconsistency is detected, the only options for avoidance are to prevent a feature from being invoked or to prevent a communications session from being established. Referring to FIG. 6, it is possible to build another option into the constraint representation by providing conditional constraints 600, 605.

Alternatives to features that have been recognised to be participating in or causing a conflict can be implemented using dynamic CSPs such as those of Mittal and Falkenhainer. These are described in "Dynamic Constraint Satisfaction Problems" by Mittal and Falkenhainer, Proceedings of the Eight National Conference on Artificial Intelligence (AAAI-90), pp 25–32. Dynamic CSPs provide a way of implementing conditional constraints.

Figure 6A:
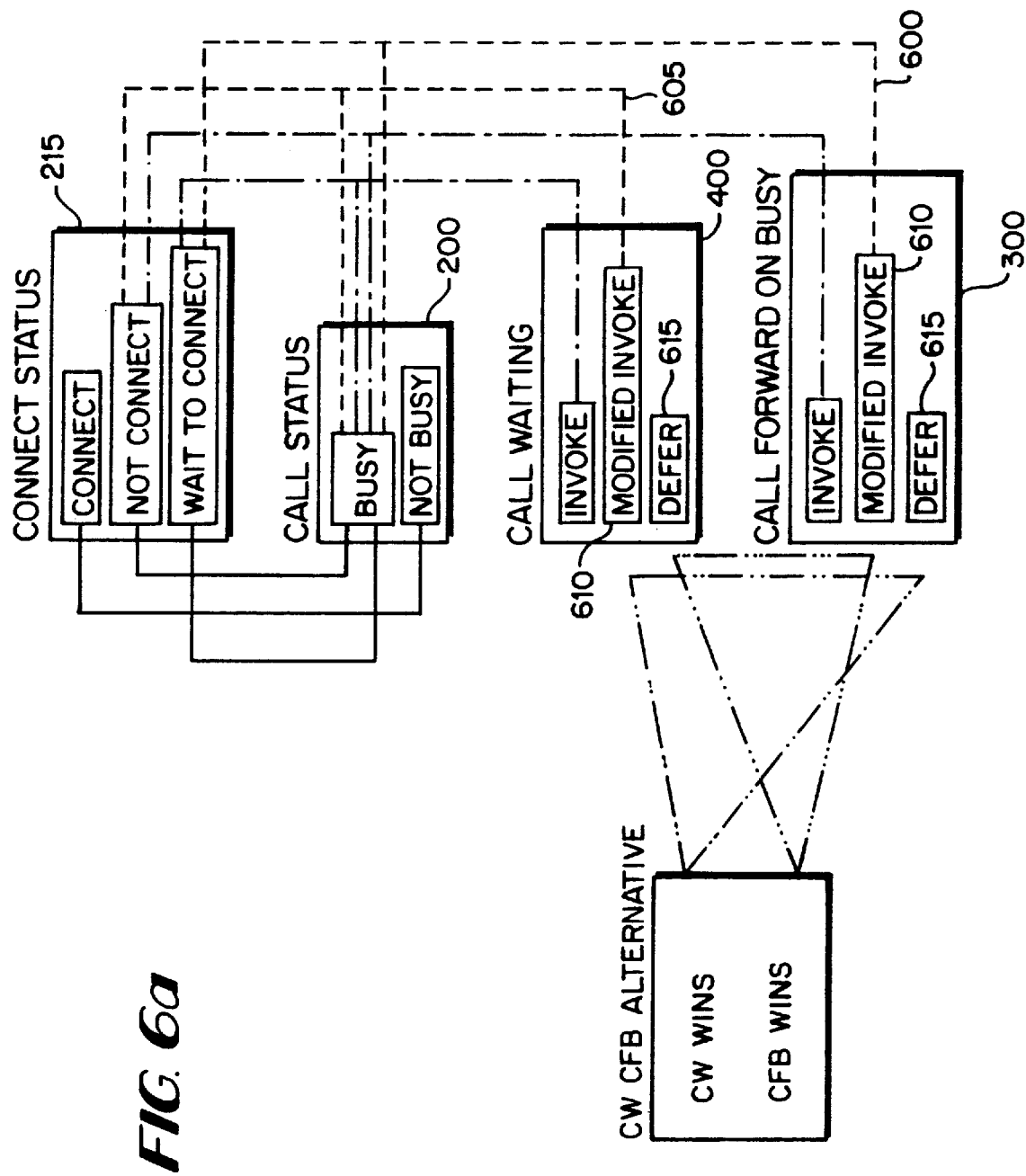
FIGS. 6a and 6b show the constraint satisfaction problem of FIG. 5, modified to include additional values for the variables "call waiting" and "call forward on busy" for the purpose of resolving conflicts.

FIG. 6 gives alternative approaches to the conflict in FIG. 5. Each alternative allows a call session to be completed, yet provides the service of one feature at the expense of the other. In FIG. 6a, the alternative approaches are represented by new values 610, 615 for both CW and CFB: MODIFIED INVOKE 610 indicates that the current feature was invoked, but in a modified form, and "DEFER" indicates that the current feature has sacrificed its own functionality so that another feature can possibly be used. Each MODIFIED INVOKE 610 has an associated tertiary constraint 600, 605 providing the modified functionality. The DEFER values 615 however need no constraints since the feature will simply not run at all.

It can be seen in FIG. 6a that the MODIFIED INVOKE 610 for each feature actually provides the functionality of a different feature. For instance, CFB 300 takes the value WAIT TO CONNECT on BUSY. This is normally the behaviour of CW 400. It should be noted that each feature, in a more realistic and therefore more complex environment, may take on functionality of any other feature to solve a conflict, not necessarily the same feature as that with which the conflict has occurred. Hence MODIFIED INVOKE 610 is not the same as DEFER 615 which simply abandons a feature altogether or in the presence of conflict.

An example of another MODIFIED INVOKE 610 for the variable CFB 300 would be to adopt RING BACK WHEN FREE. In this service, the network will set up a connection back to the caller when a busy called number becomes free. The caller then has the option to try again.

Figure 6B:
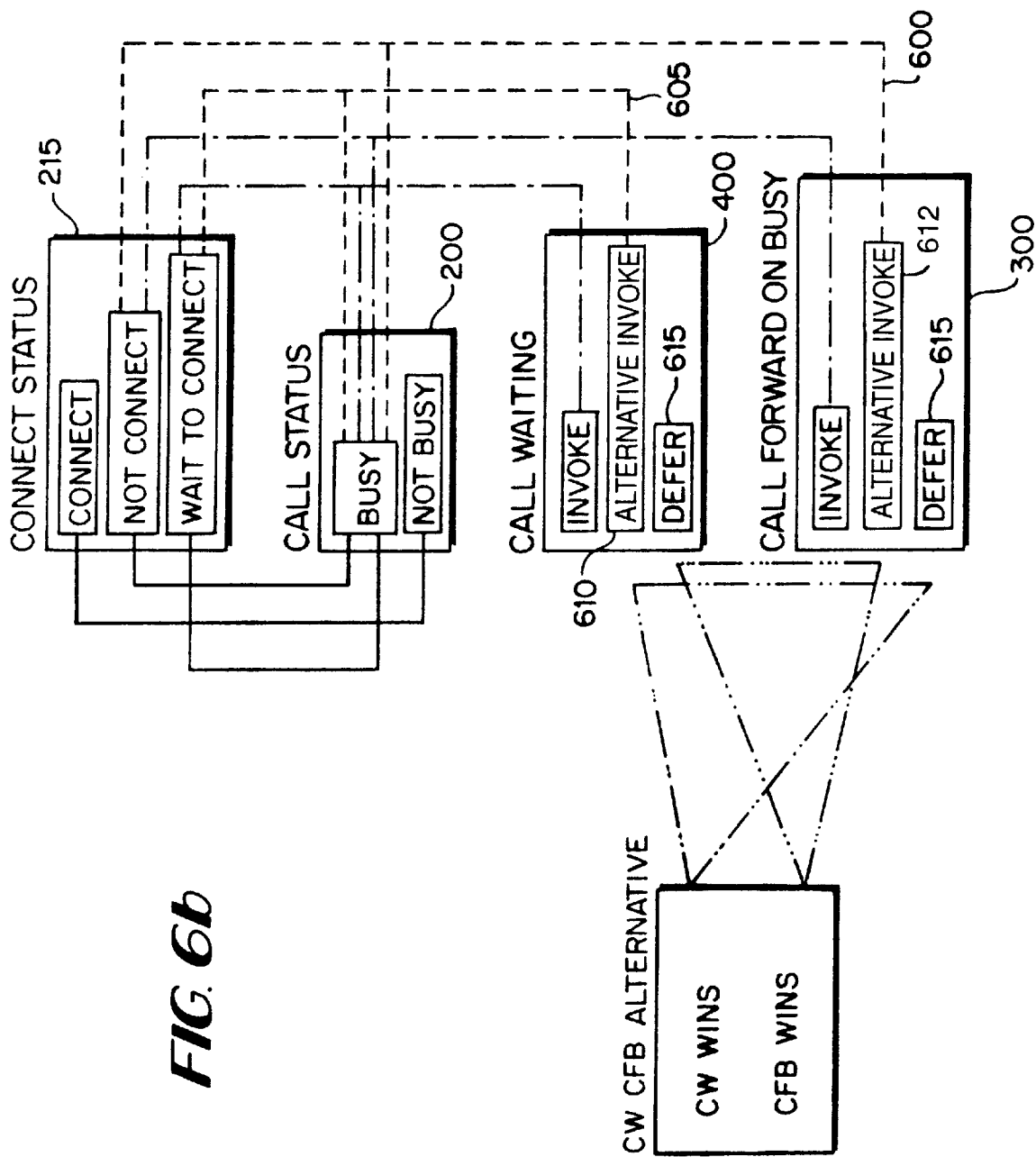

Referring to FIG. 6b, another way to resolve conflict in FIG. 5 is to use an ALTERNATIVE INVOKE 612 in which a feature is invoked so as to suppress the conflicting feature. In FIG. 6b, for instance, ALTERNATIVE INVOKE 612 for the variable CFB 300 forces the variable CW 400 to take the value DEFER 615.

This would be expressed in the constraint satisfaction problem by constraints between the variable CW 400 (the logical level) and variables at a physical/resource level. These different constraints will reveal the differences between INVOKE and ALTERNATIVE INVOKE. When the structure of the constraint satisfaction problem is then used to control call processing, ALTERNATIVE INVOKE 612 will cause the variable CW 400 to be instantiated with the value DEFER 615.

As part of the process of solving instances of the feature interaction problem, it is important to be able not only to determine which features are involved in an interaction, but more importantly to find an acceptable solution.

The process of resolution can be incorporated directly into the constraint representation as alternatives, which can be achieved by the addition of values, constraints, or even entire constraint subproblems. This has the potential to speed up the process, if an alternative actually provides an solution. If not, it could also slow the process down since searching is slowed down by added complexity.

Resolution could otherwise exist as a second phase, to be invoked only after the search for a solution including all features has been unsuccessful. The advantage to the latter approach would be that only after all standard options had been exhausted, the more costly true alternatives, which might result in removing some features, would be considered. This waiting until absolutely necessary might also minimise the loss of functionality required to insure that service is provided.

Figure 7:
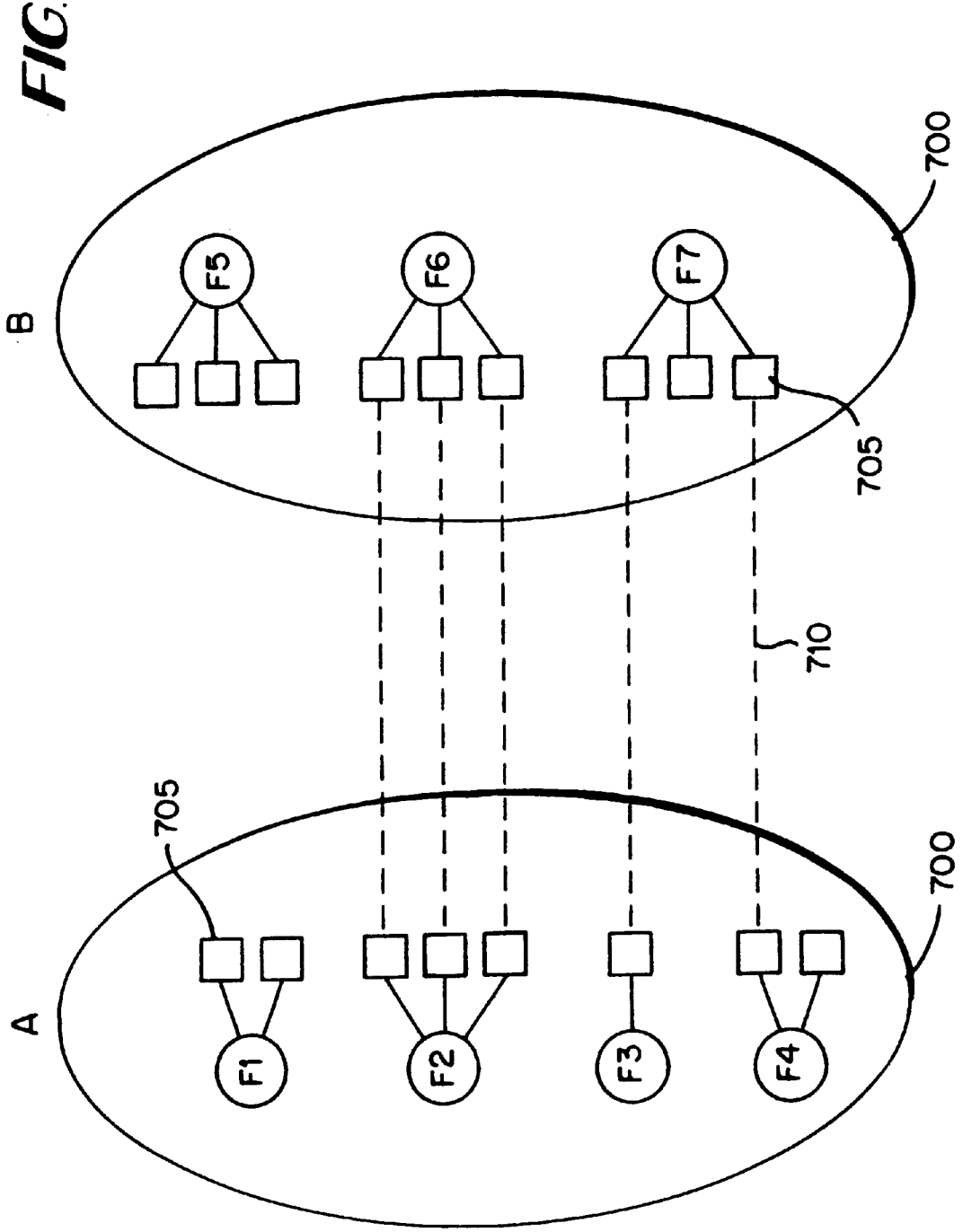
FIG. 7 shows a representation of feature sets available to a pair of users, A and B, together with the network resources on which the individual features of each feature set will call.

Referring to FIG. 7, a method of finding an acceptable solution to a detected conflict where there are several features involved is to look at the network resources generating the conflict.

Shown are feature sets 700 for two calling parties A and B, Let $F_1 \ldots F_7$ be their features, represented by circles. The squares 705 they are connected to represent the basic call resources which are accessed or modified by each feature. The dotted lines 710 indicate that a resource 705 is used by two features and causes interaction.

Assume A and B wish to engage in a communications session yet, as is indicated in FIG. 7, a subset of features of each calling party is recognised as exhibiting interaction. One way to determine the minimum number of features that are in conflict is to generate all possible combinations of features and then select the smallest set among them which exhibits interaction. However, as long as it is known that, apart, the features of A and B are free of interaction, then the problem must be among those features which access the same call resources. This limits the set of problem features to $F_2$, $F_3$, $F_4$, $F_6$, $F_7$. However, in this example, smaller subsets exist which when removed leave a connection free of interaction between A and B. These subsets are $(F_2, F_7)$, $(F_6, F_7)$, $(F_3, F_4, F_6)$, and $(F_2, F_3, F_4)$.

Verfaille and Schiox's local changes algorithm, published in "Solution Re-use in Dynamic Constraint Satisfaction Problems", AAAI, pp 307–312, 1994, can be used to find these subsets. The local changes algorithm operates by removing all variables which are inconsistent and attempts to add each one back so that they are consistent. By recursively performing this process with each inconsistent variable, it attempts to find a solution. If the set of inconsistent variables becomes empty, a consistent solution has been found. Otherwise, the process continues until all possibilities have been ruled out. In this process, if the various subsets of inconsistent variables are saved, then at the end of the process, if no solution is found, the smallest subset among those is the minimum subset of variables responsible for the inconsistency.

Referring to the problem shown in FIG. 7, after starting with an inconsistent set of features $F_2, F_3, F_4, F_6, F_7$ the local changes algorithm will recognise that there is more than one minimum set: $(F_2, F_7), (F_6, F_7)$. In this case, the system may be provided with a selection process which makes each party bear the loss or modification of features equally. Such a metric would favour cancelling or modifying features $F_2$ and $F_7$ over features $F_6$ and $F_7$.

Alternatively, the selection process may have a prioritisation aspect. For instance, user B may have paid a premium for certain features to be guaranteed. This would be reflected in B's user profile. If user A is paying a lower rate in return for accepting loss of features, and this is reflected in A's user profile, then the selection process may instead cancel or modify the subset $F_2, F_3$ and $F_4$.

Feature Interaction Management System: Context and Components

Service Creation Environment

Figure 8:
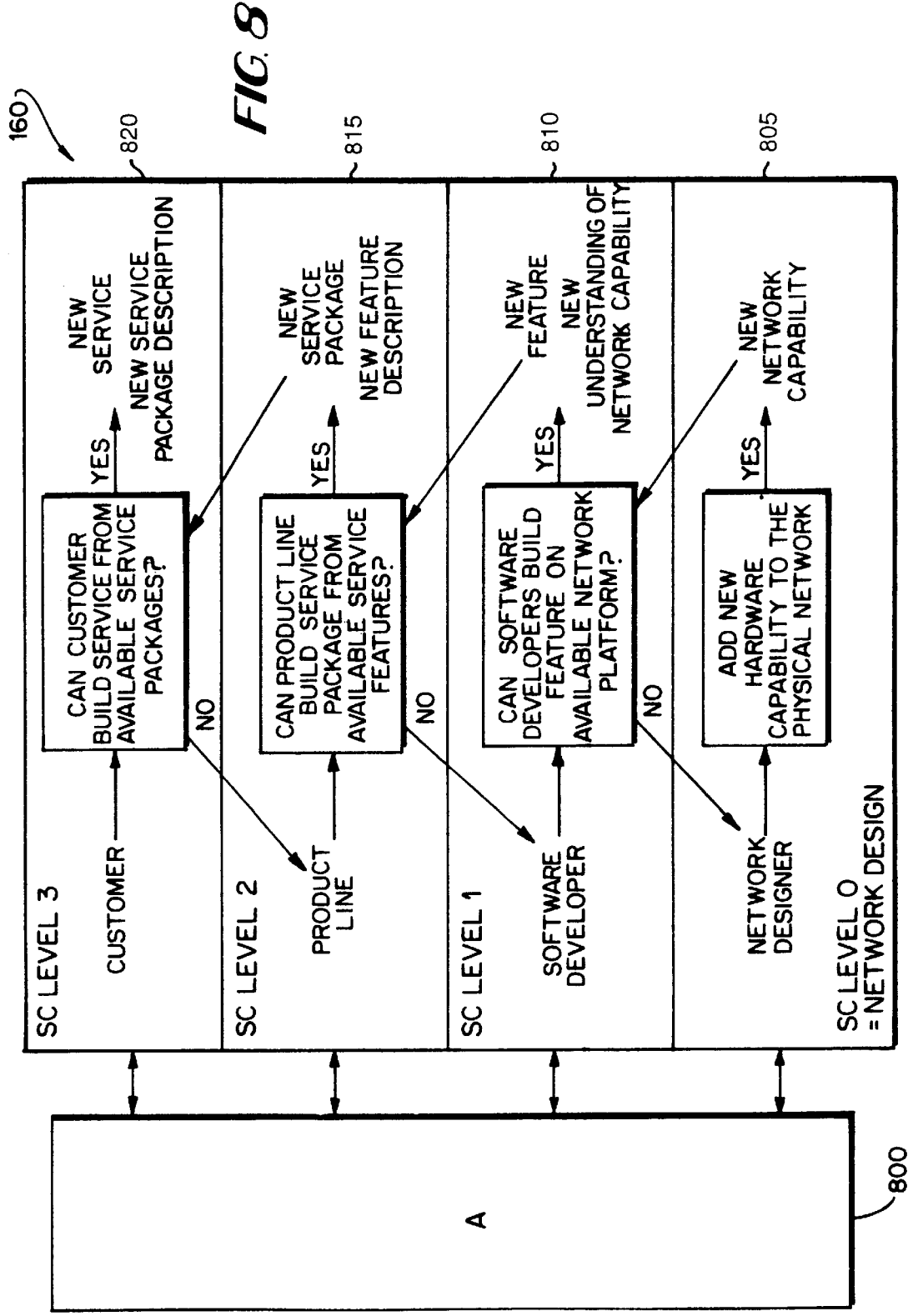
FIG. 8 shows levels of a service creation environment with which embodiments of the present invention would interact.

Referring to FIG. 8, feature interaction management systems 800 according to embodiments of the present invention could be embedded in a known type of multi-level service creation environment 160 to interact with all levels, potentially, of service creation. That is, the output of the feature interaction management system 800 can be used in i) designing or modifying the physical constraints at the network design level 805
ii) designing or modifying the logical constraints for a feature capability at the software development level 810
iii) designing or modifying service packages from service features, at the product line development level 815, or
iv) designing or modifying new services from available service packages at the customer level 820.

Figure 9:
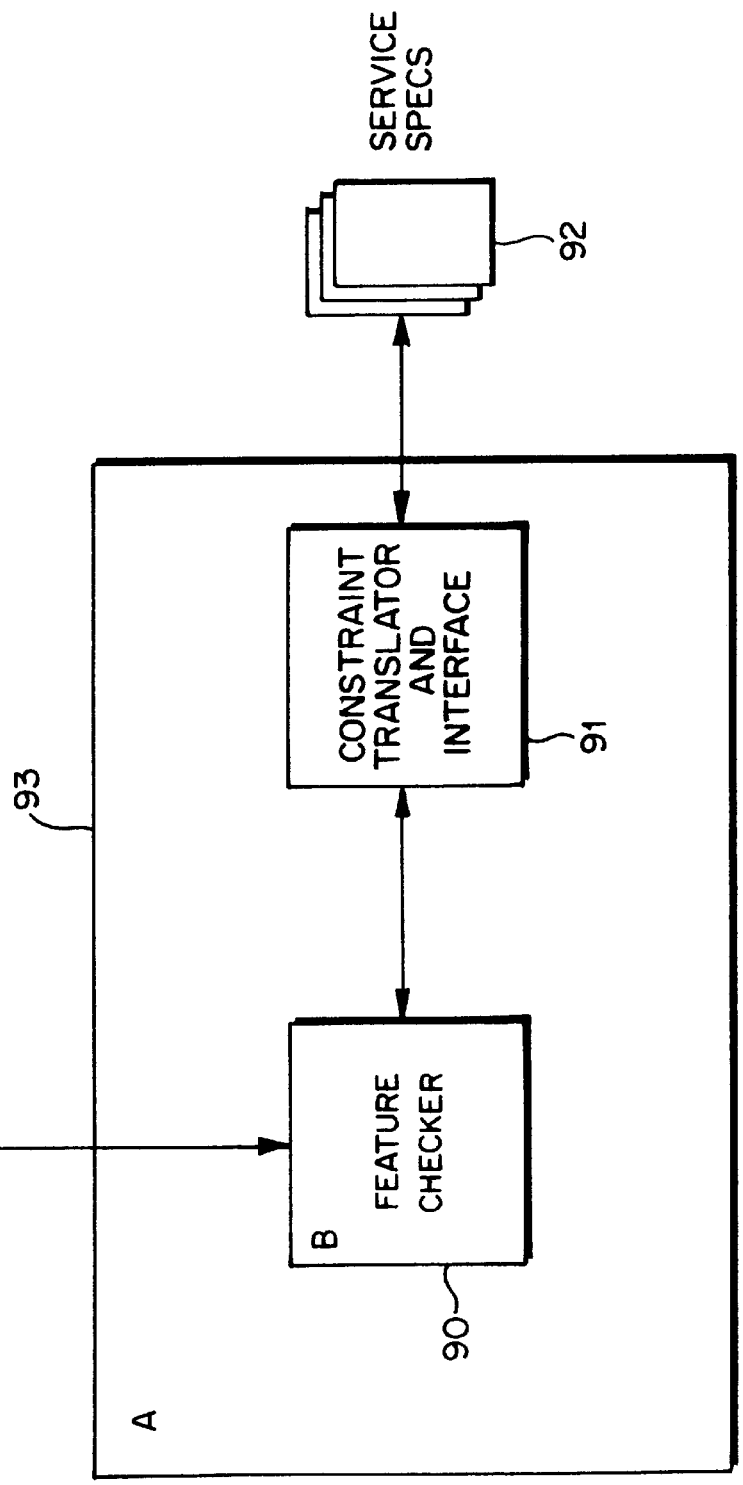
FIG. 9 shows schematically the components of the feature interaction management system for use at the time of service specification.

Referring to FIG. 9, looking at use of embodiments of the invention at service specification, that is in conjunction with the service creation environment, then the feature interaction management system 93 comprises a feature checker 90 provided with a constraint translator and interface 91 for receiving new service specifications 92 and generating constraint-based models of them. The feature checker 90 also has access to the service data point 125 where the generated constraint-based feature specifications are stored.

Figure 10:
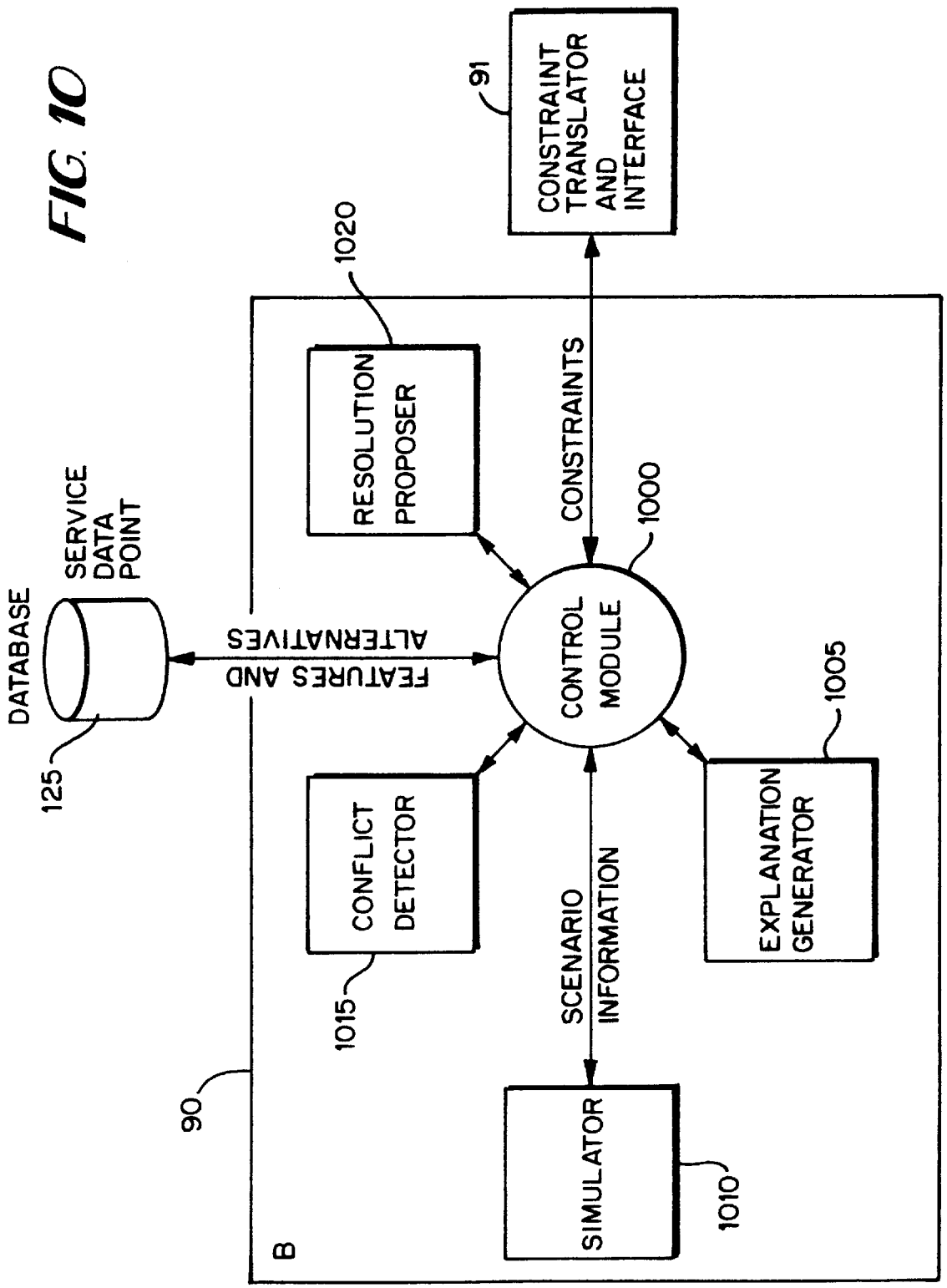
FIG. 10 shows in more detail the components of a feature checker shown in FIG. 9.

Referring to FIG. 10, the feature checker of FIG. 9 comprises a control module 1000 with interfaces to an explanation generator 1005, a simulator 1010, a conflict detector 1015 and a resolution proposer 1020. It is the control module 1000 which interfaces with the constraint translator and interface 91 and the service data point 125.

Figure 11:
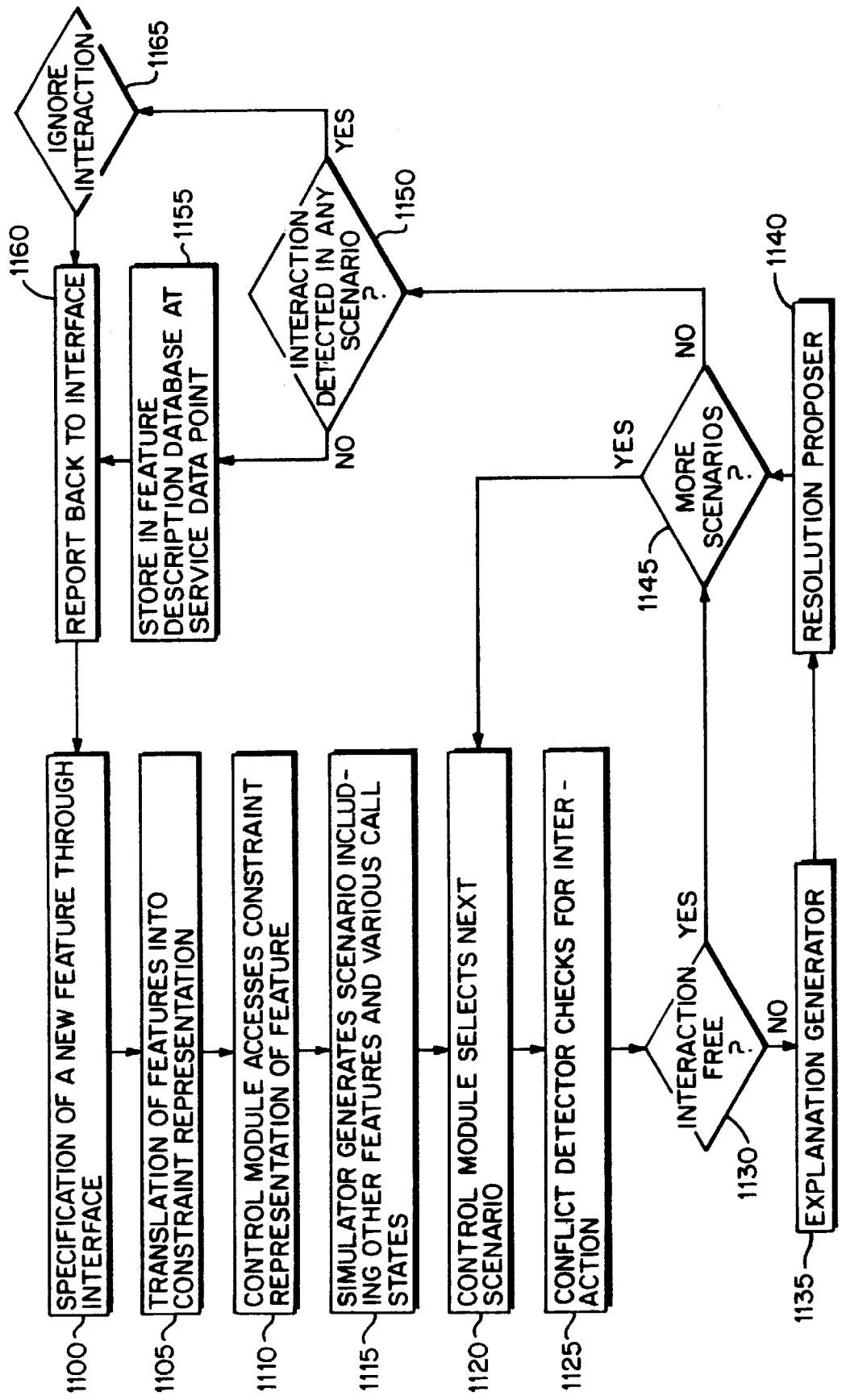
FIG. 11 shows a flow chart for detection and resolution of conflicts between features at service specification time.

Referring to FIGS. 9, 10 and 11, the operation of the feature interaction management system at feature specification time can be set out as a flow diagram. In broad outline, the process is initiated when a new service or service feature is created and a service or feature specification submitted to the feature interaction management system 93 via the constraint translator and interface 91. The specifications 92 of the service (or features) are translated into a constraint representation by the Constraint Translator & Interface 91. Note that the translation does not depend on the origin of the specifications (customer, product line, software developer or network designer). The Feature Checker then checks the new service or feature against different scenarios and generates explanations and partial solutions in case of interaction. This information is fed back to the constraint Translator & Interface 91 for the user.

Going through the flow chart of FIG. 11 in more detail, the system is triggered by receipt of the specification of a new service or feature, step 1100, at the constraint translator and interface 91. A new service or feature specification will comprise a call context, this being the call state information it requires to be operational, the resources the service or feature will use, and how it will affect the call state and the resources. An example of a specification would be for "CALL_FORWARD_ON_BUSY". The call state information is "BUSY", the resources used will be those normally used in establishing a rerouted connection in the transmission network 100 and the effect of the feature on the call state information will be to impose the state "NOT_CONNECT".

The constraint translator translates the specification into a constraint-based feature representation, step 1105. This will comprise a set of constraints and variables, representing the feature and its behaviour. For instance, FIG. 3 shows the feature "CALL_FORWARD_ON_BUSY" expressed as a constraint-based feature representation. It expresses that the feature "CALL_FORWARD_ON_BUSY" imposes the state "NOT_CONNECT" for the variable "CONNECT_STATUS" when the state of the variable "CALL_STATE" is "BUSY".

The control module 1000 receives the constraint representation of the new service or feature from the constraint translator 91, step 1110. The control module 1000 then triggers the simulator 1010 to provide a runtime scenario including existing constraint-based feature representations with which the new service features will have to be compatible, together with a range of potential call states, step 1115. A scenario will thus comprise for example a particular call status and a set of features activated. FIG. 4 provides a constraint-based feature representation which could be used to define a scenario comprising call status "BUSY" for a called user, and the feature "CALL_WAITING".

The scenarios are generated or stored by the simulator and provided in turn to the control module 1000. The control module 1000 receives each scenario, step 1120, and sends it, together with the constraint-based representation of the new feature or service, to the conflict detector 1015 to check for inconsistencies, step 1125.

The scenarios provided by the simulator 1010 may contain both call states and constraint-based feature representations but, in practice, it may be preferable that the scenarios contain call states and identifiers, or location information, for the feature representations stored in the service data point 125. The control module 1000 then obtains the relevant feature representations from the service data point 125 and sends these, with the call states, to the conflict detector 1015.

The conflict detector 1015 generates a constraint satisfaction problem (CSP) which represents a fusion of the constraint based representation of the new feature or service with the feature representations and call states given by a scenario. FIG. 5 provides an example in which the new feature "CALL_WAITING" may have been added to the feature "CALL FORWARD_ON_BUSY", and call state "BUSY", supplied by a scenario. The conflict detector then solves the CSP, in a manner as discussed above, so as to detect inconsistencies. If the conflict detector 1015 detects an inconsistency, it logs the inconsistency, step 1125.

The control module 1000 looks for logged inconsistencies, step 1130. If there is no inconsistency, indicating that there were no feature interactions, the control module 1000 will look for the next scenario, step 1120. This loop is continued until there are no more scenarios.

If a logged inconsistency is detected by the control module 1000, at step 1130, the control module 1000 passes information from the conflict detector 1015 to the explanation generator 1005. The explanation generator generates useable information from the data output of the conflict detector 1015. For instance, an explanation may be expressed as a set of constraints which are inconsistent, together with the feature variables involved in those constraints. For instance, looking at the example of FIG. 5, an explanation in that case may comprise the list:

(CFB,CALL_STATUS,CONNECT_STATUS)
(CW,CALL_STATUS,CONNECT_STATUS)

The explanation generator 1005 preferably also generates a natural language description of inconsistencies, for instance in English, for use in expressing the inconsistency to a user.

The output of the explanation generator 1005 is then forwarded to a resolution proposer 1020 which will propose a resolution, or partial resolution, step 1140. A resolution proposed to avoid a conflict will generally comprise the CSP causing conflict, with new values, variables or constraints. Such a resolution is shown in FIG. 6 in which the new values "DEFER" and "ALTERNATIVE_INVOKE" have been added to the CSP shown in FIG. 5. These resolutions, or partial resolutions, may be based on stored examples of similar, previously detected, interactions and/or may be based on rules. These rules may take into account, for instance, priorities between service features.

When there are no more scenarios in which to check a new service or feature, the control module 1000 runs a check to see if there were inconsistencies logged for any of the scenarios, step 1150. If there were no inconsistencies, the control module 1000 stores the new service or feature representation at the service data point 125 for future use, step 1155. If there were inconsistencies logged, the control module 1000 does not store the new service or feature representation but instead reports back to the constraint translator and interface 91, step 1160. The report will contain, for instance, a list of scenarios, the associated explanations from the explanation generator 1005, and the resolutions proposed by the resolution proposer 1020. This provides all the information the service creator needs to modify and recheck a service or feature representation.

Once found acceptable, a new feature or service representation can then be used to support new service logic for provision of the service or feature by the IN network.

Runtime Resolution

Referring to FIG. 12, a Feature Checker 1205 for use at runtime is similar to the Feature Checker 90 for use at service specification but no longer requires a constraint translator and interface 91. This is because there is no need to translate new service or feature specifications, constraint-based feature specifications all already being available from the service data point 125. Another difference in a runtime Feature Checker 1205 is that the control module 1200 needs a control output to the transmission network 100, and to be able to communicate with users of the transmission network 100. It therefore has an interface to the SSP in a trunk exchange 110. This interface allows the control module 1200 to pick up runtime call state information and users' profiles from the exchange and to issue control signals to the exchange 110 to modify call processing in accordance with a resolution or partial resolution proposed by the resolution proposer 1020.

Otherwise, the Feature Checker 1205 has access as before to a simulator 1010, a conflict detector 1015, an explanation generator 1005 and, as mentioned above, a resolution proposer 1020.

Referring to FIG. 13, the process described by this flow-chart is initiated by a user making a call. For this flow-chart, it is assumed that the feature checker resides at the Service Control Point. Consistently with the case of service creation, the constraint representation of features is stored in the database situated at the Service Data Point.

The process described is initiated when a phone call is made which triggers a process at the Service Data Point (e.g. access to recipient phone number in database). The control module 1200 then takes control of the call from the local exchange. Users' profiles are loaded and translated into their appropriate constraint representation using database information, any interaction is solved, appropriate control signals and explanations are sent to the local exchange which then proceeds the call. The same operations are performed each time the call's status changes and the loop is exited when the call is completed.

The control module 1200 is triggered by the SSP trigger tables when a relevant call comes into the exchange 110 from a user's CPE 105, step 1300. The control module 1200 loads the relevant user profiles for the calling and the called user from where they are stored. As shown in FIG. 12, this may be at the exchange 110 where the SSP is sited.

The triggering could be done in any suitable way but for instance there may be a "daemon" residing in the SSP 110. The daemon would detect any changes in call state for a user and, when one is detected, would trigger the control module. The control module 1200 would then access state information and user profiles from the SSP 110 and take control of the call. During feature checking operations, the call state would be "frozen" and would only change once control is returned to the SSP 110.

In an IN environment, there may be a preferred way to trigger the control module 1200. When an IN feature is activated, it registers event report requests with the basic call. When any event in the registered set occurs in the call (normally associated with a particular point or state in the call), the feature is sent an event report which causes it to respond appropriately. The feature can then return the call to that same, or any other, point in the call model. Hence, the features can be described as event driven. This facility can be used to trigger the control module 1200.

The control module 1200 could of course monitor or poll the SSP 110 instead, for changes in state, but that would probably be relatively inefficient for instance in terms of traffic loading.

In the simplest case, a user profile can be seen as a set of priorities between features. These priorities will be used by the resolution proposer 1020 in choosing a feature to propose for abandonment or modification. As seen in FIG. 6, there can be more than one explanation for the existence of a conflict between a pair of features, and therefore more than one way to resolve the conflict. In FIG. 6, the conflict could be resolved by dropping either of the feature variables "CALL_WAITING" or "CALL_FORWARD_ON_BUSY". The resolution proposer uses the user profiles to select which feature has higher priority and should therefore be retained. These priorities can also include relative priorities between users, as mentioned above. If a user has paid a premium rate for a feature to be maintained if possible, under all circumstances, then their user profile can record that information by giving the feature a higher priority rating than the same feature for a different user who has not paid the premium. This would of course apply even if the second user had given the feature the same relative priority within their own user profile.

The control module 1200 will then also load state information for the call from the SSP and, whenever there is a change of call status, call control is transferred from the SSP to the control module 1200, step 1305. The control module 1200 then triggers the simulator 1010 to provide scenarios in the same manner as at service creation, step 1310. The call status information loaded from the SSP will be translated into the CSPs generated by the conflict detector 1015, using the scenarios together with the service or feature representations as described above, by a set of assignments of values to variables. For instance, on call connection the variables "CONNECT_STATUS" for both the caller and the called party will be set to "BUSY".

The control module 1200 will step through scenarios from the simulator 1010 and, for each, run the conflict detector 1015 to create a constraint satisfaction problem and look for inconsistencies indicating feature interaction, step 1320.

If no interactions are detected, step 1325, the control module 1200 steps through each scenario in sequence, step 1330, until there are no more scenarios. If an interaction is detected in a scenario, at step 1325, this is notified to the explanation generator 1005 which produces an explanation for the resolution proposer 1020, step 1355. The resolution proposer 1020 generates a solution or partial solution, for instance based on equal loss of features to the users involved, or based on feature priorities, as discussed above, in step 1350. This solution is stored and the control module 1200 steps on to the next scenario, step 1330.

When there are no more scenarios, the control module 1200 runs a check to see if an interaction has been detected in any scenario, step 1335. If the results are positive, the control module selects the relevant resolution proposed by the resolution proposer 1020, converts it to control signals and outputs the control signals to the exchange 110 to modify the call behaviour accordingly, step 1340.

Although the call behaviour could be modified to avoid a conflict automatically, for instance by abandoning a low priority feature, it could instead be modified to offer the user or users a choice in how a call is to be progressed. This could be done by triggering an interactive voice feature provided for instance from the intelligent peripheral 130.

At this point, control is re-assumed by the exchange 110, step 1345, and the system goes back to awaiting a change in call status. When there is then a change in call status for an ongoing call, the control module 1200 runs through all the above process steps except step 1300. Step 1300 is no longer necessary since the call is already ongoing and the control module 1200 has already loaded the relevant user profiles.

What is claimed is:

1. A feature interaction management system, for use in real-time provision of communications services over a communications network by means of running call processing logic to control the network, the feature interaction management system comprising:
   (i) a feature representation store for storing constraint-based representations of communications service features;
   (ii) an accessor arranged to access said feature representation store;
   (iii) a simulator for providing simulations of call instance scenarios involving at least one communications service feature;
   (iv) a conflict detector arranged to
      receive, from the simulator, a set of values representative of a call instance;
      retrieve at least two constraint-based feature representations of service features via the accessor;
      generate at least one constraint satisfaction problem comprising the retrieved at least two constraint-based feature representations and the received set of values;
      use the generated constraint satisfaction problem to detect conflicts relating to the simulated call instance scenario; and
   (v) a resolution generator for receiving detected conflict information from the conflict detector and for generating at least a partial resolution to a detected conflict, which resolution is for use in real-time modification of the call processing logic.

2. A system according to claim 1, further comprising a store for storing resolutions output by the resolution generator in the feature representation store.

3. A system according to claim 1, wherein at least one of the constraint-based representations of features comprises:
   i) an identifier for each of a set of variables, one of the variables being identified as said feature and at least two other of the variables being identified as call status and connect status,
   ii) a set of values associated with each of at least two of the variables, wherein values can be instantiated in provision of a service or feature, and
   iii) a set of constraints which define, for instance by listing, combinations of values between different variables to be instantiated at the same time in provision of the feature.

4. A system according to claim 3 wherein the conflict detector is arranged to detect a conflict by identifying any two or more constraints which are incompatible in that they contain respective combinations which specify a different value for the same variable.

5. A system according to claim 4 wherein the resolution generator is operable to propose deletion of one or more features from the feature representation store in resolution of a conflict.

6. A system according to claim 5, wherein the resolution generator is operable to proposed deletion of said one or more features in accordance with a priority indicator.

7. A system according to claim 6 wherein the resolution generator is operable to minimize the total number of features to be deleted when proposing deletion of said one or more features.

8. A system according to claim 1, further comprising an interface for receiving information from, and sending information to, the network.

9. A system according to claim 8, wherein the interface is arranged to retrieve user profile information from the network, the user profile information including at least one communications service feature.

10. A system according to claim 9, wherein the resolution generator is operable to propose deletion of one or more features from the user profile in resolution of a conflict, said deletion being proposed in respect of at least one feature which utilizes network resources that are common to at least one other feature.

11. A system according to claim 10, wherein the resolution generator is operable to propose deletion of said features in accordance with a priority indicator.

12. A system according to claim 11, wherein the resolution generator is operable to minimize the total number of features to be deleted when proposing deletion of said features.

13. A feature interaction management system, for use in the provision of communications services over a communications network by means of running call processing logic to control the network, wherein the feature interaction management system comprises:
   (i) an accessible feature representation store for storing constraint-based representations of communications service features;

(ii) a scenario simulator for providing simulations of call instance scenarios involving at least one communications service feature; and (iii) a conflict detector for detecting conflicts between feature representations in a simulated call instance scenario;

wherein the conflict detector is adapted to detect conflicts by generating at least one constraint satisfaction problem and detecting inconsistencies in the constraint satisfaction problem, the problem comprising at least two constraint-based feature representations and a set of values for call instances, the set of values being provided by a simulated call instance scenario; and wherein the system further comprises a translator for translating service specifications for use in a service creation environment to constraint-based representations of service features.

14. A method of providing, in real-time, communications services over a communications network, the method comprising:

(a) receiving a signal representative of a request for service;

(b) generating a constraint satisfaction problem representative of service features, the problem comprising a plurality of variables and one or more predetermined relationships between values for those variables;

(c) generating a set of scenarios comprising values for at least one of the plurality of variables;

(d) running the generated scenarios and detecting conflicts arising between values assigned to any one of the plurality of variables;

(e) generating at least a partial resolution to a detected conflict;

(f) modifying, in real-time, call processing logic in accordance with the generated resolution; and (g) providing the said requested service over the communications network on the basis of the modified call processing logic.

15. A feature interaction management system, for use in the provision of communications services over a communications network by means of running call processing logic to control the network, wherein the feature interaction management system comprises:

(i) an accessible feature representation store for storing constraint-based representations of communications service features;

(ii) a scenario simulator for providing simulations of call instance scenarios involving at least one communications service feature; and (iii) a conflict detector for detecting conflicts between feature representations in a simulated call instance scenario;

wherein the conflict detector is adapted to detect conflicts by generating at least one constraint satisfaction problem and detecting inconsistencies in the constraint satisfaction problem, the problem comprising at least two constraint-based feature representations and a set of values for call instances, the set of values being provided by the simulated call instance scenario:

wherein a constraint-based representation of the at least one communications services comprises:

(a) an identifier for each of a set of variables, one of the variables being identified as said feature and at least two other of the variables being identified as call status and connect status;

(b) a set of values associated with each of at least two of the variables, which values can be instantiated in provision of a service or feature; and (c) a set of constraints which define, for instance by listing, combinations of values between different variables to be instantiated at the same time in provision of the feature;

wherein the conflict detector detects a conflict by identifying any two or more constraints which are incompatible in that they contain respective combinations which specify a different value for the same variable;

wherein a resolution generated by the resolution generator comprises the introduction of a new value for a variable, together with a new constraint which applies to the new value and contains a combination which excludes the conflict; and for use at runtime in providing the communications services, wherein the new value for the variable modifies the call processing logic, such that a feature can be provided to a user with an alternative functionality.

16. A method of providing communications services over a communications network, the method comprising:

receiving a signal representative of a request for service;

generating a constraint satisfaction problem representative of service features, the problem comprising a plurality of variables and one or more predetermined relationships between values for those variables;

generating a set of scenarios comprising values for at least one of the plurality of variables;

running the generated scenarios and detecting conflicts arising between values assigned to any one of the plurality of variables;

generating at least a partial resolution to a detected conflict;

translating service specifications of new services for use in a service creation environment to constraint-based representations of service features;

modifying call processing logic in accordance with the generated resolution and the constraint-based representations of service features; and providing said requested service over the communications network on the basis of the modified call processing logic.

17. A method of managing, in real-time, provision of communications services over a communications network by means of running call processing logic to control the network, the method comprising:

storing constraint-based representations of communications service features in an accessible feature representation store;

providing simulations of call instance scenarios involving at least one communications service feature;

receiving a set of values representative of a call instance resulting from said simulations;

retrieving at least two constraint-based feature representations of service features;

generating at least one constraint satisfaction problem comprising the retrieved at least two constraint-based feature representations and the received set of values;

using the generated constraint satisfaction problem to detect conflicts relating to the simulated call instance scenario; and generating at least a partial resolution to a detected conflict, which resolution is for use in real-time modification of the call processing logic.

* * * * *